Feb. 19, 1952   R. M. FORD   2,586,460
ONE REVOLUTION CLUTCH FOR MACHINES
Filed July 1, 1948   2 SHEETS—SHEET 1
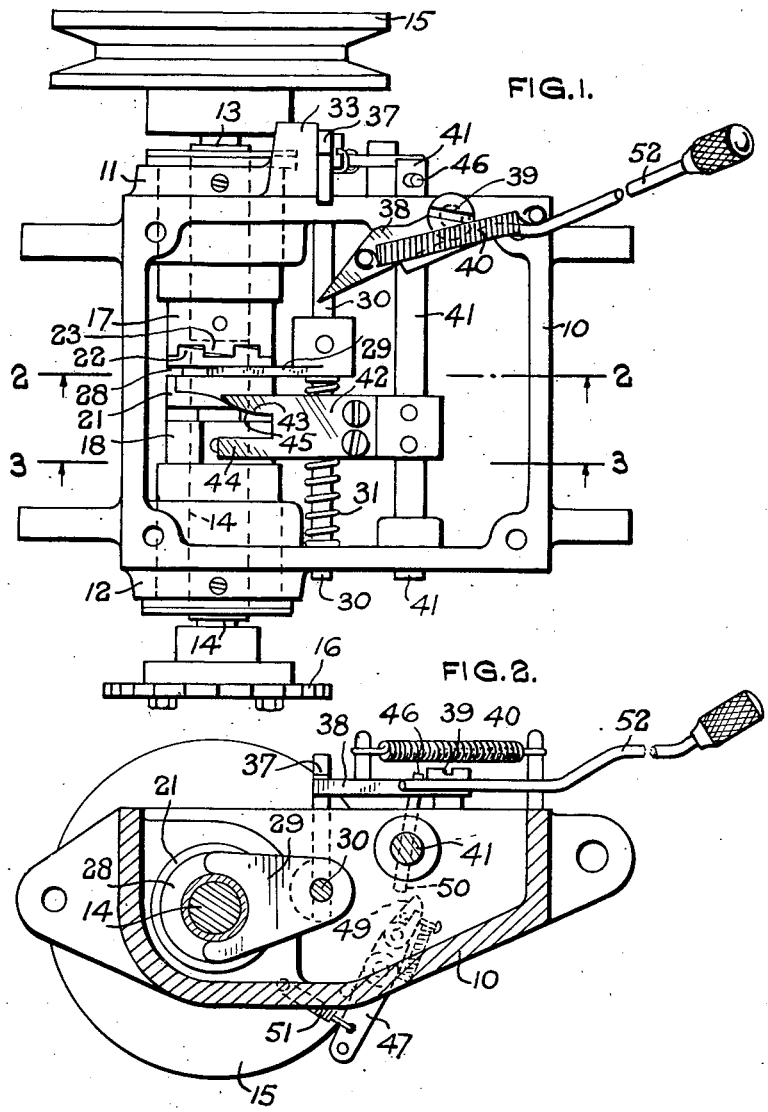
INVENTOR
Ronald Max Ford
BY Richardson and David
his ATTYS Feb. 19, 1952     R. M. FORD     2,586,460
ONE REVOLUTION CLUTCH FOR MACHINES
Filed July 1, 1948     2 SHEETS—SHEET 2
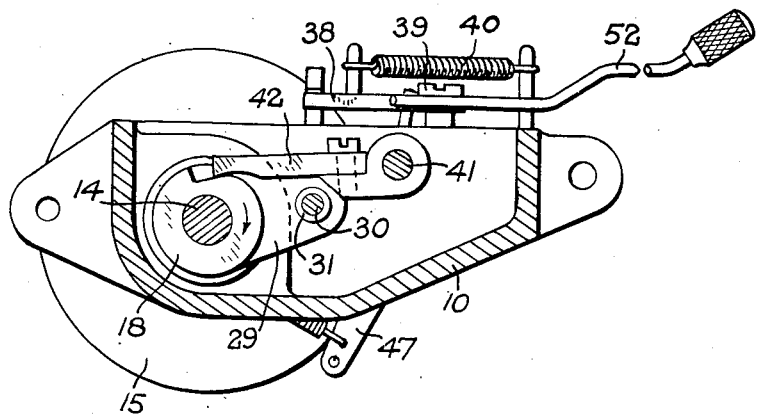
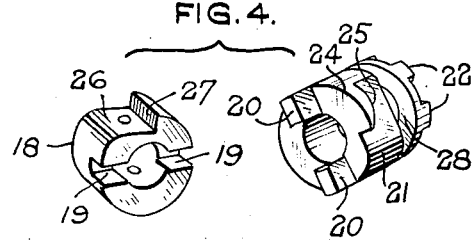
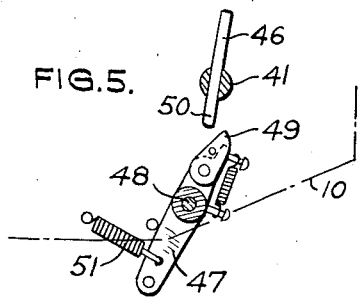 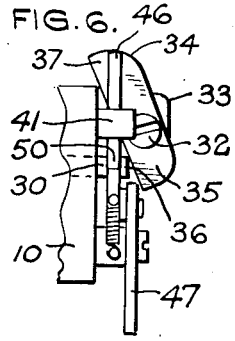
INVENTOR
Ronald Max Ford.
BY Richardson and David
his ATTYS Patented Feb. 19, 1952

2,586,460

UNITED STATES PATENT OFFICE 2,586,460

ONE REVOLUTION CLUTCH FOR MACHINES

Ronald Max Ford, Sparkbrook, Birmingham, England

Application July 1, 1948, Serial No. 36,472
In Great Britain July 4, 1947

2 Claims. (Cl. 192—33)

This invention relates to driving gear for machines, the gear being of the kind having a power-driven shaft capable of being coupled to the driving shaft of the machine by a clutch. In such driving gear it has hitherto been the usual practice for the power-driven shaft and the driving shaft to form part of the machine to be driven.

The object of the present invention is to provide an improved construction particularly suitable for driving relatively small machines of the office appliance type, such as duplicators.

According to the present invention the driving gear consists of a self-contained clutch unit which can be driven by an electric motor or other power unit, and which can be coupled to the driving shaft of the appliance to be driven, the unit having two shafts adapted to be coupled together by a clutch, one shaft of which can be coupled to a power unit and the other shaft of which can be coupled to the driving shaft of the machine to be driven, and the clutch being provided with automatic disengaging means by which the drive is automatically interrupted at the end of each revolution.

The clutch unit may comprise a casing, opposite sides of which are provided with bearings arranged in line, a driving shaft disposed in one bearing and a driven shaft disposed in the other bearing, a clutch element within the casing and mounted on one shaft adapted to be engaged by a sliding clutch member in driving connection with the other shaft for coupling the two shafts together, loading means urging the sliding clutch member towards the clutch element, automatic means for arresting rotation of the driven shaft and for moving the sliding clutch element endwise to disengage it from the clutch element at the end of each revolution, such means being releasable by the operator to restart the drive.

The automatic means for arresting the rotation of the driven shaft and for moving the sliding clutch element may comprise a lever disposed within the casing and pivoted upon an axis parallel to that of the two shafts, the lever having its free end formed as two laterally-spaced fingers, one resting upon a collar on one shaft and the other resting upon the sliding clutch member, the collar and the sliding clutch member both having their peripheries recessed locally at a suitable position, and the sliding clutch member and one of the fingers of the lever, or one of these parts, being provided with an inclined portion or portions so that when they engage, the sliding clutch member is moved axially to withdraw it from the clutch element.

The said lever may be fixed on its pivot and the pivot may project through one side of the casing and be provided at the exterior of the casing with an arm which can be actuated by an operating member so as to lift the lever within the casing out of engagement with the collar and the sliding clutch member to allow the sliding clutch member to re-engage the clutch element to restart the drive.

The operating member may be formed as a lever pivoted on the exterior of the casing and provided with a pivoted latch which can rock the arm on the pivot of the interior lever and move past the end so that if the operating member is held in the position to which it is moved for restarting the drive will be interrupted at the end of one revolution and the machine will not be restarted until the operating member has been allowed to return to its initial position and then moved forwardly again to rock the said arm.

A further spring-loaded lever may be provided upon the exterior of the casing, this lever having two positions, and in moving from one to the other passing through a dead-centre position, this further lever operating in one position to retain the sliding clutch member out of engagement with the clutch element. In the other position of this further lever the mechanism is permitted to function normally.

Referring to the drawings:

Figure 1 is a plan view of the driving gear forming the subject of the present invention;

Figure 2 is a section on the line 2—2 of Figure 1;

Figure 3 is a section on the line 3—3 of Figure 1;

Figure 4 is a view showing the components of the sliding clutch member;

Figure 5 is a view showing the operating lever which is actuated to permit re-engagement of the clutch; and Figure 6 is an end view of the operating lever mechanism.

In the construction illustrated the driving gear comprises a box-like casing 10 having bearings 11 and 12 in opposite sides, in one of which is situated a driving shaft 13 and in the other of which is situated a driven shaft 14.

The driving shaft 13 exterior to the casing is provided with a pulley 15 by which it may be constantly driven from an electric motor or other power unit. The driven shaft exterior to the casing is provided with a sprocket 16, or its equivalent, which may be connected by an endless chain to another sprocket on the driving shaft of the machine to be driven.

On the inner end of the driving shaft 13 is fixed a clutch element 17, and at that part of the driven shaft 14 which is within the casing 10 is provided a collar 18, one side of which is provided with slots 19 adapted to be engaged by teeth 20 formed on a sliding clutch member 21, as shown in Figure 4. This sliding clutch member 21 may slide upon a reduced extension of the driven shaft 14, or a reduced extension of the driving shaft 13, the former being the example shown in the drawings, and at one end it is provided with teeth 22 which can engage teeth 23 of the clutch element 17 on the driving shaft 13, and at the other end it is provided with the teeth 20 which are constantly in engagement with the slots 19 in the collar 18 for the whole of the axial movement of the sliding clutch member 21.

Further, this sliding clutch member 21 has a recessed periphery, at one side of which is a rib 24, one side of which is formed as an incline 25. The collar 18 on the driven shaft is further provided with a recessed periphery 26 terminating in a radial shoulder 27.

The sliding clutch member 21 is provided with a peripheral groove 28 between its two ends, and this is engaged by a fork 29 adapted to slide on a pin 30 which can slide in bearings in opposite sides of the casing 10. This pin 30 is parallel to the driving and driven shafts, and the sliding fork 29 is spring-loaded by a spring 31 so that it tends to move the sliding clutch member 21 into engagement with the clutch element 17 on the driving shaft 13.

Pivoted at 32 to a lug 33 upon the exterior of the casing is a lever 34, one arm 35 of which can engage the projecting end 36 of the pin 30 carrying the fork 29, and the opposite arm 37 of which can be engaged by a lever 38 pivoted at 39 on the top of the casing. This lever 38 may be spring-loaded by a spring 40 so that when it moves from one terminal position to another it passes over a dead centre and it has an operating handle 52 fixed thereto or formed integrally therewith so that the lever 38 can be turned about its pivotal axis 29. When turned clockwise as seen in Figure 1 this lever 38 engages the arm 37 on lever 34 (see Figures 1 and 6) and moves the lever 34 pivoted on the lug 33 on the exterior of the casing so as to slide the pin 30 and cause the fork 29 to withdraw the sliding clutch member 21 and to hold it out of engagement with the clutch element 17 on the driving shaft 13. In the other position of the lever 38 as shown in Figure 1 the fork 29 on the sliding pin 30 acts upon the sliding clutch member 21 and tends to move it into driving engagement with the clutch element 17 on the driving shaft 13. Thus by turning the lever 38 to engage the arm 37 on lever 34 the sliding clutch member 21 can be held out of engagement for any desired period.

Within the casing 10 and parallel to the axis of the driving and driven shafts is a spindle 41 carrying a lever 42 the free end of which is formed with two laterally-spaced fingers 43 and 44. One of these 44 rests upon the top of the collar 18 on the driven shaft 14, and the other 43 is formed with an incline 45 for engaging the incline 25 on the sliding clutch member 21. During the time when the collar 18 is rotating the finger 44 of this lever 42 rests upon its periphery, but at the end of each rotation the finger 44 of the lever 42 drops so that it engages the radial shoulder 27 on the collar 18 and thus arrests the rotation of the driven shaft 14, while the other finger 43 engages the sliding clutch member 21 and withdraws it from the clutch element 17 on the driving shaft 13.

The spindle 41 carrying the lever 42 provided with the fingers is provided with an arm 46 which is exterior to the casing, and this spindle 41 is adapted to be rocked by an operating lever 47 pivoted at 48 to the exterior of the casing and having a pivoted latch 49 which can rock the said arm 46 and then move past its end 50 so that the said arm 46 can return to its original position. This operating lever 47 is spring-loaded by a spring 51 and it can be operated through cables connected to a hand- or foot-operated lever.

With the arrangement described the drive is automatically interrupted at the end of every revolution and it can be restarted by moving the operating lever 47 to lift the fingers 43 and 44 from the collar 18 and sliding clutch member 21. When this is done the sliding clutch member 21 moves into engagement with the clutch element 17 on the driving shaft 13 and the drive continues for one more revolution when the fingers 43 and 44 of the lever within the casing drop into their operative position and arrest the rotation of the driven shaft 14 and withdraw the sliding clutch member 21.

What I claim then is:

1. Driving gear of the kind specified consisting of a self-contained clutch unit comprising, a casing containing a driving shaft adapted to be driven by an external power unit, a driven shaft in axial alignment with said driving shaft adapted to be coupled to the machine to be driven, a clutch element fixedly mounted on one shaft, said element having axially directed teeth, a sliding clutch member mounted for axial movement on the other shaft and having driving engagement therewith, said clutch member having axially directed teeth adapted for driving engagement with the teeth on the clutch element, a spindle parallel to said shafts mounted slidably in said casing a loading member fixed on said spindle and having portions engaging the clutch member, spring means acting on said loading member so as to urge the clutch member axially into engagement with the clutch element, a collar on said other shaft, and a lever, pivotally mounted within said casing and having portions co-operating with said sliding clutch member and said collar so as to withdraw said clutch member axially from engagement with the clutch element and arrest rotation of said other shaft once during each revolution.

2. Driving gear of the kind specified consisting of a self-contained clutch unit comprising, a casing containing a driving shaft adapted to be driven by an external power unit, a driven shaft in axial alignment with said driving shaft adapted to be coupled to the machine to be driven, a clutch element fixedly mounted on one shaft, said element having axially directed teeth, a sliding clutch member mounted for axial movement on the other shaft and having driving engagement therewith, said clutch member having axially directed teeth adapted for driving engagement with the teeth on the clutch element, loading means urging the sliding clutch member in an axial direction into engagement with the clutch element, a collar on said other shaft, a spindle rotatably mounted within said casing parallel to said shafts, a lever fixed on said spindle and having portions co-operating with said sliding clutch member and said collar so as to withdraw said clutch member axially from engagement with the clutch element and arrest rotation of said other shaft once during each revolution, an arm on one end of said spindle and an operating member pivoted on the outside of the casing and carrying a pivoted latch adapted to actuate said arm to cause the said portions of said lever to disengage from said clutch member and said collar and thereby permit rotation of said other shaft and re-engagement of the clutch member.

RONALD MAX FORD.

REFERENCES CITED

The following references are of record in the file of this patent:

UNITED STATES PATENTS

| Number | Name | Date |
|---|---|---|
| 330,851 | Puetz | Nov. 17, 1885 |
| 1,153,831 | Slentz | Sept. 14, 1915 |
| 1,435,482 | Lamb et al. | Nov. 14, 1922 |

FOREIGN PATENTS

| Number | Country | Date |
|---|---|---|
| 1,439 | Great Britain | Dec. 18, 1897 |